July 20, 1965  M. DENENBERG  3,195,799
CANS AND METHOD OF MAKING THE SAME
Filed May 8, 1962  3 Sheets-Sheet 1
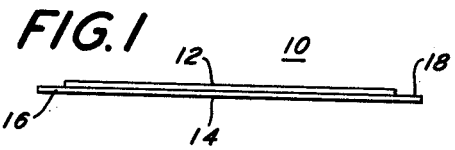
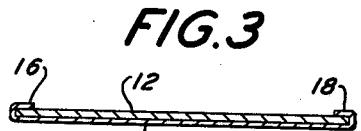
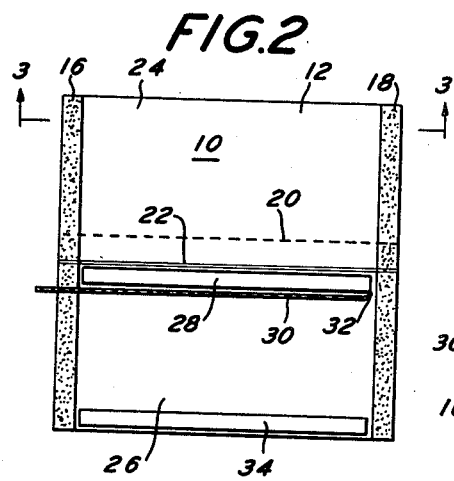
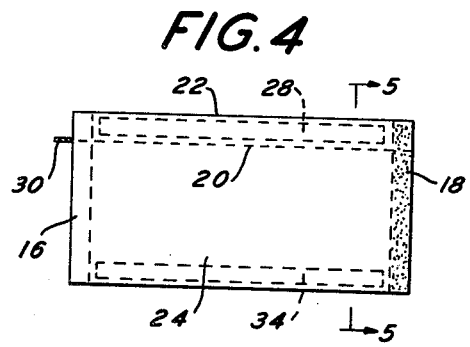
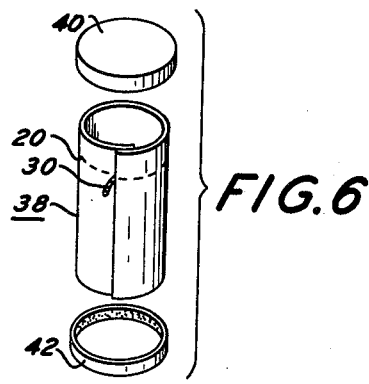
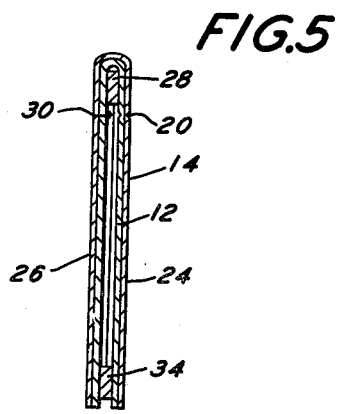
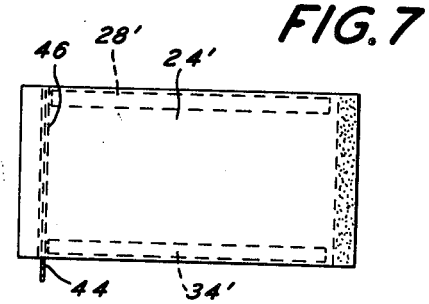
INVENTOR.
MAURICE DENENBERG
BY
ATTORNEY July 20, 1965   M. DENENBERG   3,195,799
CANS AND METHOD OF MAKING THE SAME
Filed May 8, 1962   3 Sheets-Sheet 2
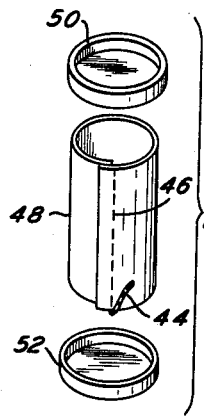
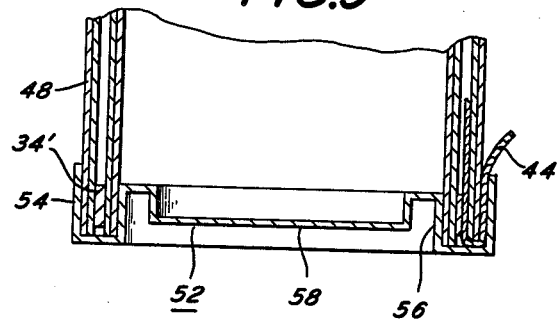
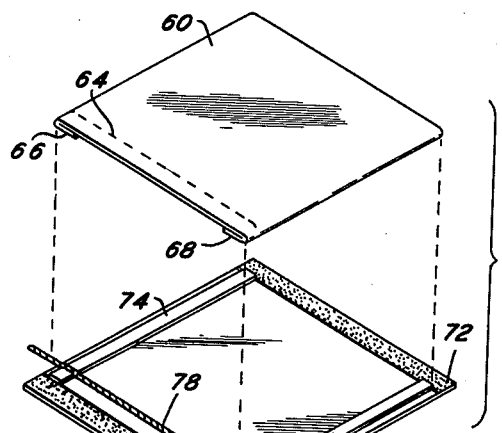
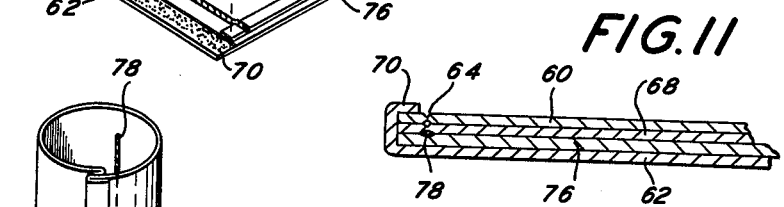
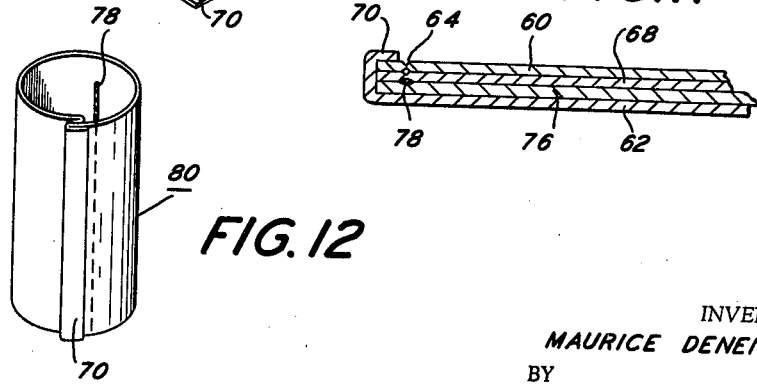
INVENTOR.
MAURICE DENENBERG
BY
Arthur H. Seidel
ATTORNEY July 20, 1965   M. DENENBERG   3,195,799
CANS AND METHOD OF MAKING THE SAME
Filed May 8, 1962   3 Sheets-Sheet 3

INVENTOR.
MAURICE DENENBERG
BY
Arthur H. Seidel
ATTORNEY

United States Patent Office 3,195,799
Patented July 20, 1965

3,195,799
CANS AND METHOD OF MAKING
THE SAME
Maurice Denenberg, 468 Wyngate Road, Wynnewood, Pa.
Filed May 8, 1962, Ser. No. 193,284
7 Claims. (Cl. 229—51)

In general, this invention relates to a new and different can structure and method of making the same. More particularly, it relates to the manufacture of cans from a paper and liquid impervious layer laminate which is simple in construction and provides a rigid body structure.

In the past, in the manufacture of cans or other tube-like structures, it was necessary to use tin plated metal sheets or spirally wound aluminum and cardboard laminate strips.

It is the general object of this invention to provide a new and useful can structure utilizing a laminate of paper and a liquid impervious material.

Another object of this invention is to provide a can structure which is completely sealed yet may be opened without the benefit of a can opener or the like.

Another object of this invention is to provide a laminated can body simple and easy to manufacture which can be completely sealed and provide a smooth inner surface for the can.

Another object is to provide a new and simpler method of manufacturing can bodies from a liquid impervious material and paper laminate.

Other objects will appear hereinafter.

For the purpose of illustrating the invention there is shown in the drawings forms which are presently preferred; it being understood, however, that this invention is not limited to the precise arrangements and instrumentalities shown.

FIGURE 1 is an end view of a sheet of metal foil laminate utilized in the present invention.

FIGURE 2 is a plan view of the laminate of FIGURE 1 after one operation in the manufacture of a can structure.

FIGURE 3 is a cross sectional view of the laminate of FIGURE 2 taken along lines 3—3.

FIGURE 4 is a plan view of the laminate of FIGURE 2 after another step in the manufacture has been completed.

FIGURE 5 is a cross sectional view of the structure in FIGURE 4.

FIGURE 6 is an exploded view of a can manufactured from the sheet of laminate of FIGURE 1.

FIGURE 7 is a second embodiment of a sheet of laminate similar to the one shown in FIGURE 1 utilized in manufacturing a second embodiment of the present invention.

FIGURE 8 is an exploded view of a can manufactured from the embodiment shown in FIGURE 7.

FIGURE 9 is a cross sectional view of the bottom of the can shown in FIGURE 8.

FIGURE 10 is a perspective view of the first step in manufacuring a third embodiment of the present invention.

FIGURE 11 is a partial cross sectional view of the embodiment shown in FIGURE 10 after one step in the manufacture has been completed.

FIGURE 12 is a perspective view of the body of a can manufactured from the embodiment shown in FIGURE 10.

In the drawings, like numerals indicate like elements.

Figure 13:
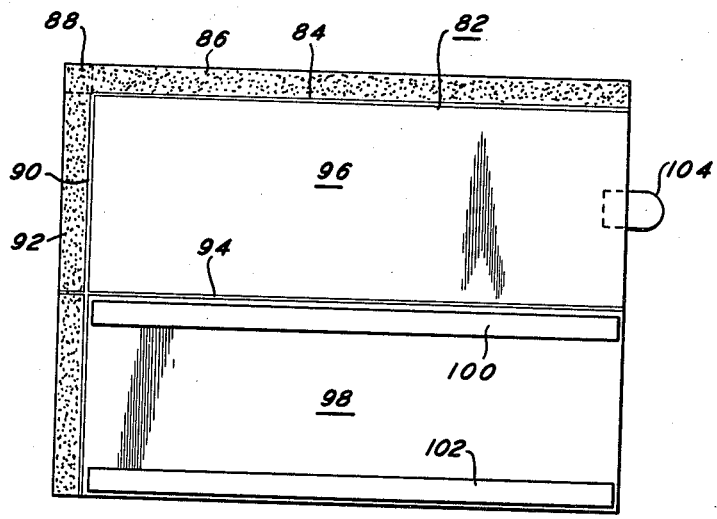
FIGURE 13 is a plan view of a laminate in the first step of manufacture in accordance with the fourth embodiment of the present invention.

In FIGURE 1, there is shown a laminated sheet 10 having a kraft paper 12 and an aluminum foil layer 14. The kraft paper layer would be normally about .001 inch thick while the aluminum foil layer would be approximately .0002 inch thick. It should be noted that liquid impervious material might be utilized in place of the aluminum foil, such as nylon, Mylar, polystyrene or the like.

The aluminum foil layer 14 is wider than the paper layer 12 and has lapping edges 16 and 18 extending longitudinally along two opposite side edges of the sheet 10.

As shown in FIGURE 2, the side edges 16 and 18 are lapped over the paper layer 12 so as to form metal side edges for the sheet 10. The metal lapped portions 16 and 18 then have an adhesive coating placed thereon.

A score line 22 is then made across the center of the sheet 10 from the side 16 to the side 18. The score line 22 divides the sheet 10 into an upper half 24 and a lower half 26.

A perforating line 20 is then made parallel to the score line 22 on the upper half 24. A cardboard reinforcing bar 28 is then glued just below the score line 22 on the bottom half 26. A string 30 is placed parallel to the reinforcing bar 28 on the side opposite the score line 22. The string 30 has one end extending over a side edge of the sheet 10. The other end of the string 30 is preferably attached to the reinforcing bar 28 at a point 32 near the opposite side edge of the sheet 10. A second reinforcing bar 34 is placed along the bottom edge of the bottom portion 26.

As shown in FIGURE 4, the top portion 24 is folded over along the score line 22 and adhesively secured to the bottom portion 26 along the edges 16 and 18. The structure shown in FIGURE 4 is then rolled into a tubular body such as is shown in FIGURE 5 with the string 30 extending outside of the tubular body 38.

Top and bottom covers 40 and 42 respectively are then placed over the ends of the tubular body 38. By utilizing reinforcing bars 28 and 34, the tubular body 38 will not be crushed at its end portions when the covers 40 and 42 are placed thereon. All seams are then heat sealed so as to provide a water tight container.

To open the can, the user need only pull on the string 30. The score line 20 is spaced directly above the string 30. Therefore, when the string 30 is pulled, the top portion 24 will be torn along the line 20. Since the string 30 is adhesively attached to the bottom portion 26, the paper immediately attached to the string 30 will be torn along a line similar to the perforation line 20. Thus, the user will have removed the top portion of the can.

A second embodiment of the present invention is shown in FIGURES 7, 8 and 9. In FIGURE 7, the laminate used to produce the second embodiment is shown in a position similar to the laminate of the first embodiment in FIGURE 4. In FIGURE 7, the laminate structure has a front portion 24' and reinforcing bars 28' and 34' between the top portion 24' and the bottom portion. One side edge 18' has adhesive therealong. A string 44 extends from the top of the portion 24' to the bottom of the portion 24' and through the opening in the bottom adjacent one side of the reinforcing bar 34'. The string 44 is adhesively secured to the bottom portion. The perforation line 46 is made in the top portion 24' exactly in line with the string 44.

The structure of FIGURE 7 is then wound into a tube body 48 as is shown in FIGURE 8. Top cover 50 and bottom cover 52 are then placed in position on the tube 48. The metal to metal contact portions are then heat sealed so as to form a watertight can.

Since the string 44 comes out through the bottom of the can, the seal must be made between the cap 52 and the tube 48 along an inner peripheral edge of the tube 48. This is better shown in the cross sectional view of FIGURE 9.

The cap 52 consists of an outer peripheral flange 54 whose diameter is substantially the outer diameter of the tube 48, and an inner peripheral flange 56 whose diameter is substantially the inner diameter of the tube 48. A recessed interior portion 58 completes the cap 52. The heat seal is effected between the inner flange 56 and the inner surface of the tube 48. The string 44 is then free to lie outside the completed can structure. When the user desires to open the can of FIGURE 8, he need only pull on the string 44. This tears the can open along the line 46 and also the line on the inner edge of the tube 48 where the string 44 was adhesively secured.

A third embodiment of the present invention is shown in FIGURES 10, 11 and 12. In this embodiment, it is desired to have liquid impervious seals along the inner edges of the can body. As shown in FIGURE 10, the laminate which makes up the tube body consists of an upper laminated sheet 60 and a lower laminated sheet 62. The upper and lower laminated sheets 60 and 62 are in all ways similar to the sheet 10 of FIGURE 1. Opposite side edges 66 and 68 of the sheet 60 are folded over and adhesively secured to the bottom of the sheet 60. A perforating line 64 is placed along an edge of the sheet 60 between edges 66 and 68.

The bottom sheet 62 has adhesively coated opposite side edges 70 and 72. Reinforcing bars 74 and 76 are placed along opposite edges between the side edges 70 and 72. A string 78 is placed between the reinforcing bars 74 and 76 with one end of the string extending beyond the sheet 62. The string 78 is in line with the perforation 64 on the upper sheet 60.

The sheet 60 is then adhesively secured to the bottom sheet 62 and the side edges 70 and 72 of the sheet 62 are lapped over the sheet 60 to hold it in place. This product is then rolled into a tube 80 such as is shown in FIGURE 12. This tube 80 has a smooth inner surface and is provided with a metal to metal liquid impervious joint along the bonded edge. The bonding is accomplished by means of a heat seal.

Caps similar to the caps 50 and 52 of FIGURE 8 are placed on the tube 80. Thus a liquid impervious seal is provided on every joining surface in the interior of the can.

The string 78 might in the alternative be placed around the periphery of the can such as was accomplished in FIGURE 6.

The use of a kraft paper body having a metal foil coating provides a can structure which is substantially rigid in construction and impervious to fluids stored in the can. However, the kraft paper is a material which can be easily torn by a string such as has been shown in the previous embodiment.

A fourth embodiment of the present invention is shown in FIGURE 13. In this embodiment, a sheet 82 is utilized having two side edges 86 and 92 of aluminum foil. A score line 84 separates the side edge 86 from the rest of the sheet 82. A score line 90 separates the side edge 92 from the rest of the sheet 82. Since the side edges 86 and 92 are at right angles to each other, they form a corner portion 88. This corner portion 88 is cut out from the sheet 82.

A score line 94 separates the paper and metal foil laminated portion of the sheet 82 into two equal portions 96 and 98 along a line parallel to score line 84.

Figure 15:
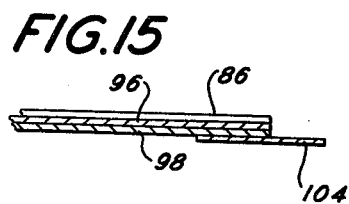
FIGURE 15 is a partial cross sectional view of the embodiment shown in FIGURE 14 taken along lines 15—15.

The top portion 96 has a tab 104 adhesively secured to the back of an edge opposite side edge 92. The tab 104 is made of a thin metal and extends onto the portion 96 a distance less than the width of the side edge 92. This is necessary for reasons which will be better explained with reference to FIGURES 15 and 16.

Figure 14:
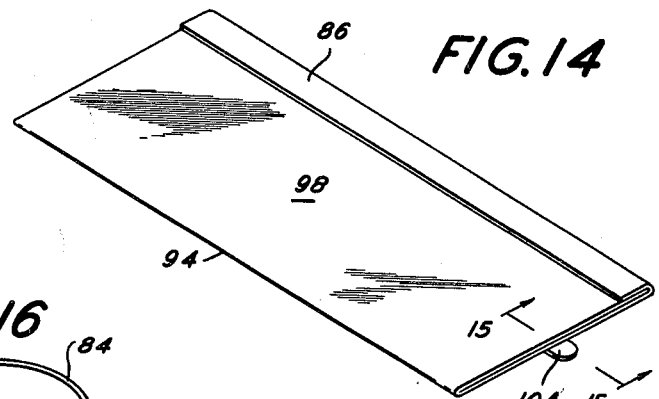
FIGURE 14 is a perspective view of the embodiment shown in FIGURE 13 after a second step has been completed in its manufacture.
Figure 16:
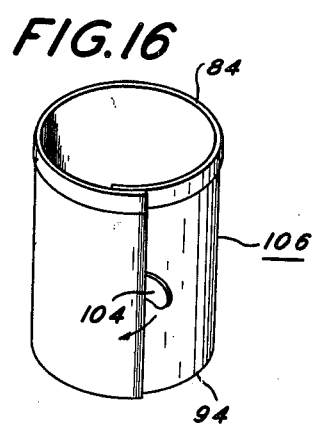
FIGURE 16 is a perspective view of a completed can body manufactured in accordance with the embodiment of FIGURE 13.

Two reinforcing bars 100 and 102 are placed on opposite edges of the portion 98 parallel to the score line 94. The side edge 92 is adhesively coated and folded over along score line 90 to form a metallic edge along score line 90. Bottom portion 98 is then folded over top portion 96. The top aluminum foil edge 86 is folded along score line 84 and adhesively secured to the back of bottom portion 98. When this is accomplished, the sheet is as shown in FIGURE 14. The sheet as shown in FIGURE 14 is then folded into a tube 106 as shown in FIGURE 16. In this position, the tab 104 is between the two joining edges of the tube 106. However, as stated previously, the tab 104 does not extend into the interior of the tube 106. Therefore, when the edges of the tube 106 are sealed, the tab 104 does not provide a weak point along the joining edges on the interior of the can body 106.

Top and bottom caps may then be placed on the tube 106. These top and bottom caps may be of the type 40 and 42 shown in FIGURE 6. The top edge 84 and the bottom edge 94 of the tubular can body 106 are covered by the liquid impervious material. By heat sealing along the outside edges of the tube 106, a can is manufactured which has liquid impervious seals on all inside surfaces of the can.

In order to open the can, the user need only pull on tab 104 in the direction of the arrow shown in FIGURE 16. This will separate the edges of the can at this point or tear the can body at a point substantially along the center of the can body.

Although the main body has been shown as a tube, it is to be understood that any annular configuration may be utilized within the scope of this invention.

The present invention may be embodied in other specific forms without departing from the spirit or essential attributes thereof and, accordingly, reference should be made to the appended claims, rather than to the foregoing specification as indicating the scope of the invention.

I claim:

1. A can body comprising a multi-layer tubular laminate having an innermost non-porous layer defining the inner tube surface, flexible tearing means having an end accessible at the can body exterior and extending between the outer surface of said innermost layer and another layer of said laminate, and means securing said tearing means along a tear line to the outer surface of said innermost layer with sufficient strength to overcome the cohesive strength of said innermost layer under a pulling force from the accessible end of said tearing means to tear material from said innermost layer and open said innermost layer the extent of said tear line.

2. The can body of claim 1 wherein said tearing means comprises a string and said securing means comprises an adhesive.

3. The can body of claim 2 including a perforating line on the exterior surface of the can body in alignment with the string.

4. The can body of claim 1 wherein the tear line extends around the can body.

5. The can body of claim 1 wherein the tear line extends longitudinally along the can body.

6. The can body of claim 1 wherein said innermost layer comprises aluminum foil defining the inner tube surface.

7. The can body of claim 1 wherein said laminate includes reinforcing strips located between the inner and outer surfaces of the can body.

(References on following page)

References Cited by the Examiner

UNITED STATES PATENTS

| | | | |
|---|---|---|---|
| 1,246,650 | 11/17 | Peterson | 229—3.5 |
| 2,005,351 | 6/35 | Rosenblatt | 229—3.5 |
| 2,106,499 | 1/38 | Francisco | 229—3.5 |
| 2,142,101 | 1/39 | Bachmeyer | 229—4.5 |
| 2,185,391 | 1/40 | Allen | 229—4.5 X |
| 2,218,027 | 10/40 | Hatch | 93—94 |
| 2,467,016 | 4/49 | Dunlap | 229—4.5 X |
| 2,611,483 | 9/52 | Adams | 229—51 X |
| 2,775,395 | 12/56 | Bergstrom | 229—51 |
| 2,795,366 | 6/57 | Magill | 229—51 |
| 2,848,151 | 8/58 | O'Neil | 229—4.5 |
| 2,858,057 | 10/58 | Mullinix | 229—3.5 X |
| 2,943,540 | 7/60 | McBain | 93—94 |
| 2,982,457 | 5/61 | D'Alelio | 229—4.5 X |
| 3,004,694 | 10/61 | Karl | 229—4.5 |
| 3,021,048 | 2/62 | Pottle | 229—51 |
| 3,093,287 | 6/63 | Stark. | |
| 3,106,327 | 10/63 | Karl | 229—4.5 |

GEORGE O. RALSTON, *Primary Examiner.*